C. STERN & G. F. EGAN.
AUTO TAIL LAMP AND SIGNAL.
APPLICATION FILED NOV. 3, 1917.

1,286,825.

Patented Dec. 3, 1918.
2 SHEETS—SHEET 1.

Witnesses

Inventors
C. Stern,
G. F. Egan,
By Victor J. Evans
Attorney

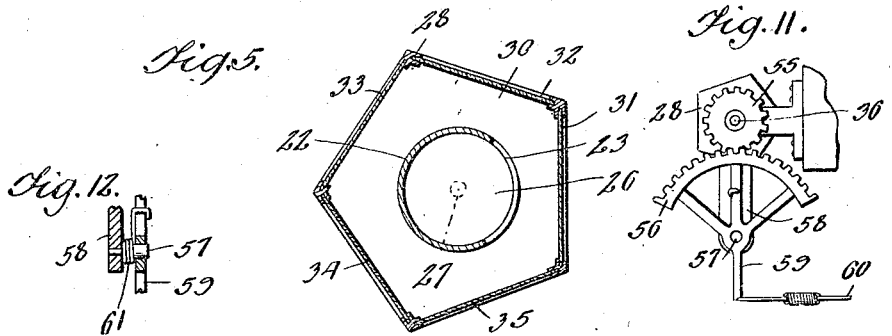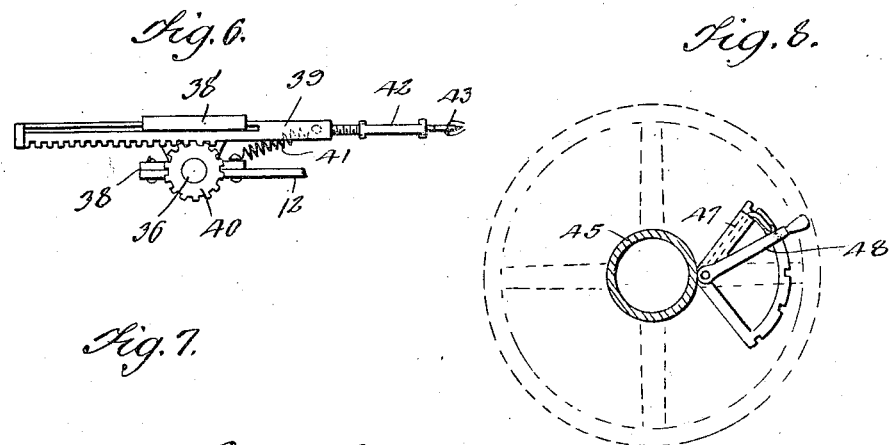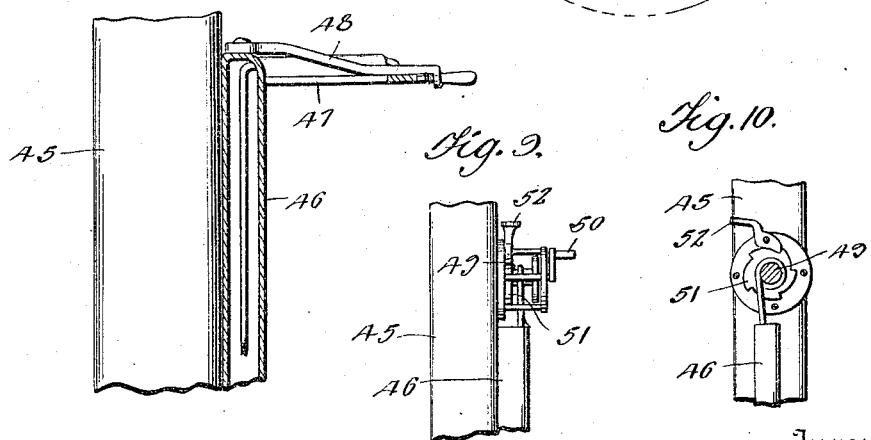

UNITED STATES PATENT OFFICE.

CHARLES STERN AND GEORGE F. EGAN, OF JERSEY CITY, NEW JERSEY.

AUTO TAIL LAMP AND SIGNAL.

1,286,825.      Specification of Letters Patent.      Patented Dec. 3, 1918.

Application filed November 3, 1917. Serial No. 200,133.

*To all whom it may concern:*

Be it known that we, CHARLES STERN and GEORGE F. EGAN, citizens of the United States, residing at Jersey City, in the county of Hudson and State of New Jersey, have invented new and useful Improvements in Auto Tail Lamps and Signals, of which the following is a specification.

This invention relates to a combined tail light and signal which is particularly adapted for use upon motor vehicles such as automobiles and the like.

The primary object of the invention is to provide a combined light and signal for a vehicle of this character which is so constructed that not only will the license number of the machine and indicia upon tags connected therewith be rendered visible at a considerable distance, but the signal portion of the device may be operated from the driver's seat to indicate to following machines the operator's intentions relative to stopping or changing the direction of travel of the vehicle.

Another object of the invention is to provide operating means for the signal portion of the device which may be connected with the steering post of the machine to which the device is applied, thereby obviating the necessity of the operator of the vehicle releasing his hold upon the steering wheel when desiring to indicate to following vehicles his intentions regarding the stopping or changing the direction of travel of his machine.

A further object of the invention is to provide operating mechanism for the signal portion of the device which will include means whereby after the signal portion of the device has been turned to indicate the operator's intentions relative to stopping or turning his machine, the signal portion of the device may be automatically restored to its normal position.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications within the scope of the claim may be resorted to when desired.

In the drawings:—

Fig. 5 is a section on the line 5—5 of Fig. 3.

Fig. 6 is a detail view of a portion of the operating mechanism for the signal portion of the device.

Fig. 7 is a detail view of a portion of the operating mechanism for the signal portion of the device and showing the same connected with the steering post of a motor vehicle.

Fig. 8 is a top plan view of Fig. 7.

Figs. 9 and 10 are detail views of a slightly modified form of the operating mechanism of the signal portion of the combined tail light and signal.

Fig. 11, is a detail view illustrating a slightly modified form of the invention.

Fig. 12, is a section on the line 12—12, of Fig. 11.

Like characters of reference denote corresponding parts throughout the several views in the drawings.

Figure 1:
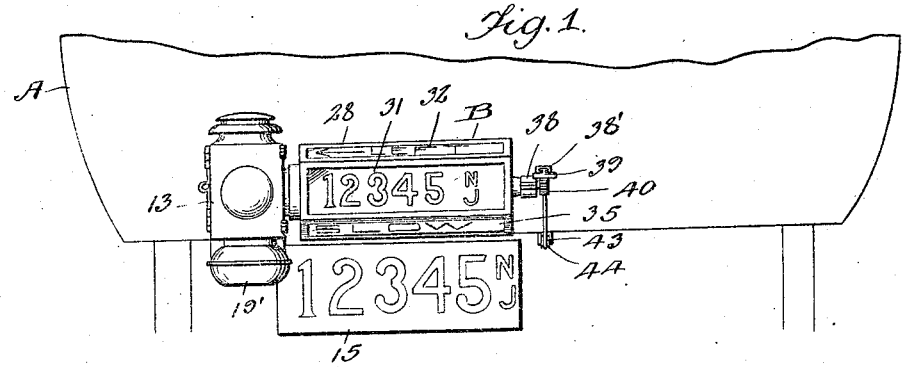
Figure 1 is a view in side elevation of a combined tail light and signal and showing the same mounted at the rear of an automobile.
Figure 2:
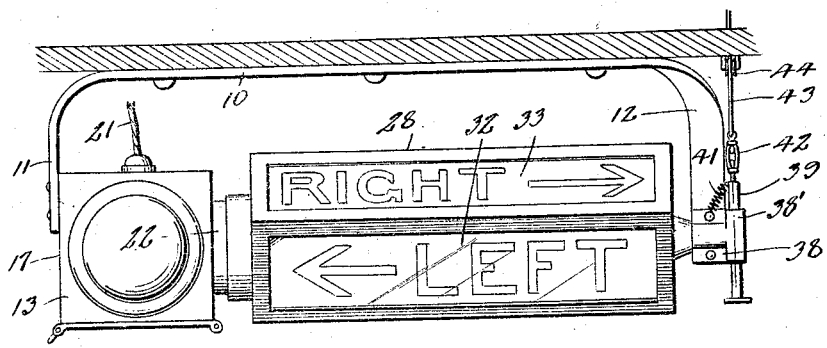
Fig. 2 is a top plan view of Fig. 1.
Figure 3:
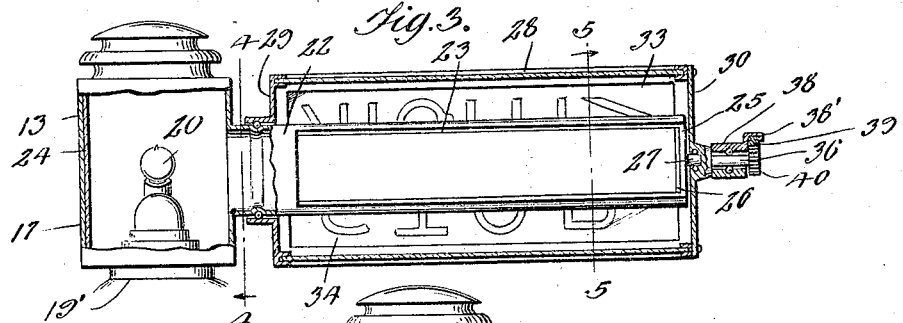
Fig. 3 is a longitudinal section through the combined tail light and signal.
Figure 4:
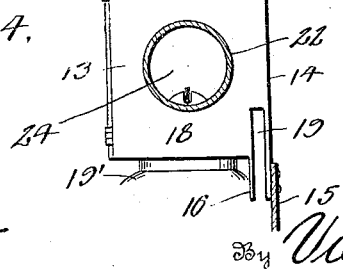
Fig. 4 is a section on the line 4—4 of Fig. 3.

Referring now to the drawings in detail the letter A designates the rear portion of a motor vehicle and which in this instance has been shown as a portion of an automobile to which is applied a combined tail light and signal B constructed in accordance with the invention.

The device B which is adapted to serve as a visual signal and also as means operable from the driver's seat to indicate the driver's intentions relative to the stopping or changing the direction of travel of his machine includes a yoke wherein the connecting bar 10 for the arms 11 and 12 of the yoke is secured to the back of the body A in any suitable manner.

A lamp casing 13 is fixed to the arm 11 of the yoke and is provided with an open front and bottom. The rear wall 14 of the casing 13 extends a considerable distance below the open bottom of the casing to permit a tag 15 bearing the license number of the machine to be connected therewith and coacts with the flange 16 on the side walls 18 and 17 of the casing in providing a channel 19 through which light within the casing 13 may be directed upon the tag.

Slidably connected with the side walls 17 and 18 of the lamp casing and closing the bottom thereof is an oil lamp 19' in which is formed a socket for an electric bulb 20 connected with wires 21 included in the lighting system of the automobile. A hollow shaft 22 opens out into the casing 13 through the side wall 18 thereof and has formed therein a longitudinally extending opening 23 and into this shaft, light from the lamps 19' and 20 is reflected by a reflector 24 on the wall 17 of the lamp casing. The outer end of the shaft 22 is closed by a wall 25 on which is mounted a reflector 26 and a bearing stud 27.

The shaft 22 extends within an indicator casing 28 which is of pentagonal shape in cross section and has the end walls 29 and 30 thereof engaged with bearing balls arranged in race ways in the shaft 22 and stud 27. Removably mounted in each side of the indicator casing 28 is a panel and these panels which are designated in the drawings by the numerals 31, 32, 33, 34 and 35 have printed thereon in transparent letters suitable indicia by means of which the operator of the vehicle may indicate to a following machine his intentions relative to the stopping or changing the direction of travel of his vehicle.

In the drawings the panel 31 has printed thereon in transparent letters the license number of the machine while the panels 32 and 33 have printed thereon the words "Left" and "Right" and the panels 34 and 35 have printed thereon the words "Stop" and "Slow," so that by turning the casing 28 upon the shaft 22 the lettering upon either of the panels 32, 33, 34 or 35 may be clearly seen by the operator of the vehicle following the machine to which the combined tail light and signal is applied.

The end wall 30 in the casing 28 has formed thereon a stub shaft 36 which is mounted to turn in a boxing 38 on the arm 12 of the yoke and has formed therefrom a guide 38 in which is mounted to slide a rack bar 39 which is engaged with a pinion 40 on the stub shaft 36.

The rack bar 39 which comprises a part of the operating mechanism of the indicating portion of the combined tail light and signal is yieldably held against the sliding movement in the guide 38 by a spring 41 which is connected with the rack bar and boxing 37. The guide 38 and rack bar 39 are so arranged that when the spring 41 moves the rack bar to the limit of its movement the panel 31 of the casing 28 is in a plane parallel with the front of the casing 13, which is the normal position of the parts. Adjustably connected with the rack bar 39 by a turn buckle 42 is a cable 43 which is trained over pulleys 44 on the body A and leads to the steering post 45 of the automobile. The steering post 45 has fixed thereto a casing 46 through which the cable 43 passes for a portion of its length. The casing 46 is provided with a rack 47 with which is swingingly connected a lever 48 connected with the cable 43.

Through the above described manner of connecting the cable 43 with the lever 48 it will be seen with reference to the drawings that when the operator of the machine to which the combined tail and signal light is applied desires to indicate to a following vehicle his intentions relative to the stopping or changing the direction of travel of his machine he can through the operation of the lever 48 turn the casing 28 until the desired panel therein is exposed to the view of the operator of the following machine.

After the operator of the vehicle following the one to which the combined tail light and signal is attached has been notified of the driver's intentions on the forward machine the lever 48 is released from engagement with the rack 47 to permit the spring 41, to restore the lever 48, and the casing 28, to their normal position.

In Figs. 9 and 10, in the drawings, the casing 46, on the steering post 45, of the machine is shown as having associated therewith a drum 49, provided with an operating handle 50, by means of which the cable 43, may be wound about upon the drum to turn the casing 28, on the shaft 22. The drum 49, is provided with a ratchet wheel 51, which is engaged by a spring pressed thumb piece 52, by means of which the drum may be locked against rotation.

In the modified form of the invention shown in Figs. 11 and 12, of the drawing, the shaft 36, on which the casing 28, is mounted, is provided with a pinion 55, which meshes with a rack segment 56. This segment is supported for rocking movement at 57, from a bracket arm 58, and below the pivot the segment is provided with an arm 59, to which an actuating connection 60, is arranged. This connection is adapted to be extended to the controlling device hereinbefore described in order that pull can be exerted against the connection and rocking motion transmitted to the segment 56, and rotary motion set up in the pinion 55, to cause one of the display panels thereof, to be operatively presented in display position. In order that the casing 28, can be held normally in a license number displaying position, a spring 61, is coiled about the pivot 57, and operatively connected with the segment so that the center thereof is normally positioned beneath the center of the pinion. The same movements can be imparted to the connection 60, as are imparted to the flexible connection described elsewhere herein in order that all of the requisite changes in position of the casing 28, can be made.

Having thus described the invention, what is claimed as new is:—

A device of the class described comprising a lamp casing, a tubular shaft extending from one side of said casing and communicating with the interior thereof, said shaft having a longitudinally extending opening therein and having its outer end closed, a reflector on the inner face of said outer end, means in the lamp for reflecting the light into the shaft, a stud on the closed end of said shaft, an indicating casing rotatably mounted on said shaft and stud, a stud shaft on the end of said casing, a bearing for said shaft and means engaging with the said shaft for rotating the casing.

In testimony whereof we affix our signatures.

CHARLES STERN.
GEORGE F. EGAN.

Copies of this patent may be obtained for five cents each, by addressing the "Commissioner of Patents, Washington, D. C."